(12) United States Patent
Banin et al.

(10) Patent No.: US 10,027,356 B2
(45) Date of Patent: Jul. 17, 2018

(54) ZERO-CROSS-PRE-DISTORTION (ZCPD) ALGORITHM FOR DTC BASED POLAR DTX

(71) Applicant: Intel IP Corporation, Santa Clara, CA (US)

(72) Inventors: Elan Banin, Raanana (IL); Uri Parker, Shimshit (IL); Ofir Degani, Haifa (IL); Michael Kerner, Tel Mond (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/274,509

(22) Filed: Sep. 23, 2016

(65) Prior Publication Data
US 2018/0091177 A1    Mar. 29, 2018

(51) Int. Cl.
| | | |
|---|---|---|
| *H04L 27/00* | (2006.01) | |
| *H04B 1/04* | (2006.01) | |
| *H04L 27/36* | (2006.01) | |

(52) U.S. Cl.
CPC ......... *H04B 1/0475* (2013.01); *H04L 27/367* (2013.01)

(58) Field of Classification Search
CPC ... H04L 1/0003; H04L 1/0071; H04L 5/0007; H04L 1/0009; H04L 27/0008; H04L 27/368; H04L 25/03343; H04L 27/367; H03F 1/3247; H03F 1/3294; H03F 2201/3233; H04B 1/0475
USPC ................ 375/296, 295, 316, 219
See application file for complete search history.

(56) References Cited

U.S. PATENT DOCUMENTS

| | | | |
|---|---|---|---|
| 2003/0179831 A1* | 9/2003 | Gupta | H03F 1/3247 375/296 |
| 2006/0067429 A1 | 3/2006 | Beyer et al. | |
| 2006/0217083 A1* | 9/2006 | Braithwaite | H03F 1/3282 455/114.3 |
| 2007/0063772 A1* | 3/2007 | Carichner | H03F 1/3241 330/149 |
| 2007/0268984 A1 | 11/2007 | Abel et al. | |
| 2008/0008320 A1 | 1/2008 | Hinton, Sr. et al. | |
| 2014/0266822 A1 | 9/2014 | Henzler et al. | |

OTHER PUBLICATIONS

"International Application Serial No. PCT/US2017/047954, International Search Report dated Nov. 15, 2017", 3 pgs.
"International Application Serial No. PCT/US2017/047954, Written Opinion dated Nov. 15, 2017", 6 pgs.

* cited by examiner

*Primary Examiner* — Zewdu Kassa
(74) *Attorney, Agent, or Firm* — Schwegman Lundberg & Woessner, P.A.

(57) ABSTRACT

Devices and methods of compensating for a bandpass filter are generally described. A DTx includes a BPF from which an output signal is produced and a DFE having a zero crossing (ZC) pre-distorter (ZCPD). The ZCPD compensates for ZC distortion from a desired analog signal caused by the BPF. The ZCPD adjusts a DTC code word to generate a DTx output signal to be applied to the BPF. The compensation is dependent on a magnitude of the square wave immediately prior to and after the ZC. The compensated DTC and a DPA code word are used to generate the DTx output signal. The compensation produced by the ZCPD is free from compensation for non-linear responses to the DTC and DPA code words.

17 Claims, 11 Drawing Sheets

US 10,027,356 B2

ZERO-CROSS-PRE-DISTORTION (ZCPD) ALGORITHM FOR DTC BASED POLAR DTX

TECHNICAL FIELD

Embodiments pertain to communication devices. Some embodiments relate to a Digital Polar Transmitters (DTx). Some embodiments relate to output signal distortion compensation in a DTx.

BACKGROUND

The use of communication devices, especially mobile communication devices, has continued to increase, in large part due to the increase in available applications and content such as gaming and video streaming. As a result, networks continue to develop, with the next generation wireless communication systems, such as the $4^{th}$ and $5^{th}$ generation (4G, 5G) systems, striving to improve access to information and data sharing. 5G in particular looks to provide a unified network/system that is able to meet vastly different and sometime conflicting performance dimensions and services driven by disparate services and applications while maintaining compatibility with legacy communication devices and applications. Communication devices are likewise under continual development to use enhanced aspects of such networks, such as increased bandwidth from carrier aggregation over multiple bands.

One issue involving communication devices is conversion of data into signals and vice-versa in the device. In some communication devices, various elements in the transmitter and receiver chain, such as filters and amplifiers, may cause inhomogeneities in the creation of an output signal and may cause a non-ideal output signal to be produced. Communication device designers continue to determine the causes of deviations from signal ideality and correct the deviations through hardware and software solutions.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
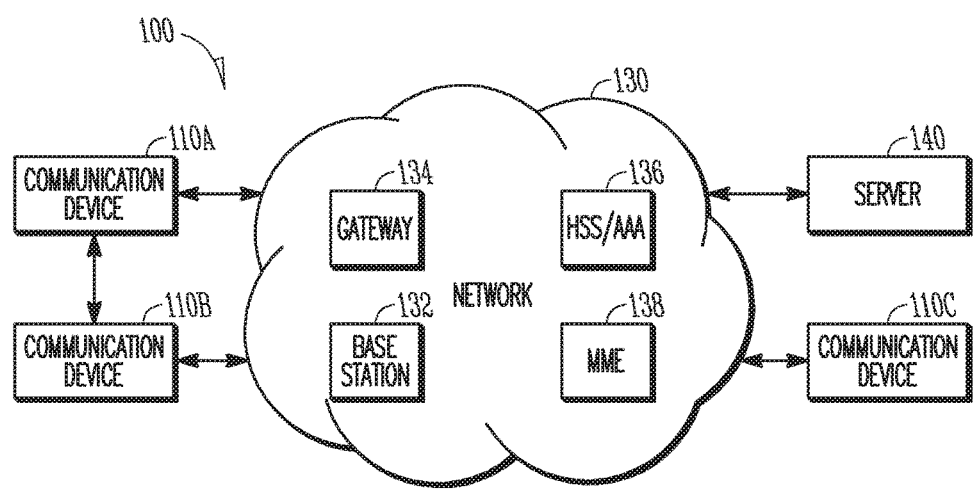
FIG. 1 is a functional diagram of a wireless network in accordance with some embodiments.

FIG. 1 is a functional block diagram illustrating a communication system in accordance with some embodiments. FIG. 1 is a functional block diagram illustrating one embodiment of a network 100 in which communication devices 110a, 110b, 110c communicate with other communication devices and/or one or more servers 140. The communication devices 110a, 110b, 110c may communicate with each other directly or through one or more networks 130. The communication devices 110a, 110b, 110c may communicate wirelessly locally, for example, via one or more micro, pico or nano cells, base stations (BSs) or access points (APs) or directly using any of a number of different protocols, such as WiFi, Bluetooth or Zigbee, among others. Alternatively, the communication devices 110a, 110b, 110c may also communicate through the network 130 via Third Generation Partnership Project Long Term Evolution (3GPP LTE) networks and LTE advanced (LTE-A) networks, $4^{th}$ generation (4G) networks or $5^{th}$ generation (5G) networks or other wireless communication standards. Although wireless communications are mainly described, in some embodiments, one or more of the communication devices 110a, 110b, 110c may also or instead communicate via a wired link. Examples of communication devices 110a, 110b, 110c include, but are not limited to, mobile devices such as portable handsets, smartphones, tablet computers, laptop computers, wearable devices, and sensors. The devices may be user devices or machine type communication (MTC) devices or the internet of things (IOT) devices. The server 140 may provide audio and/or video content or support for applications running on the communication device 110a, 110b, loc. Note that although communication devices are shown in FIG. 1, in other embodiments, some or all of the devices may be wired devices.

The network 130 may have all of the features, hardware, and systems of networks, however, only a few elements in the network 130 are shown for exemplary purposes. The network may contain a base station (which may be e.g., an enhanced NodeB or eNB) 132, a gateway 134 (serving and/or home gateway), a Home Subscriber Server (HSS) 136, and a Mobility Management Entity (MME) 138, among others. The base station 132 may provide the initial point of connection to the network 130 by each communication device 110a. 110b, 110c. The HSS 136 may be a database of user (subscriber) information, i.e., customer profiles and provide authentication for use of the network 130 by a particular communication device 110a, 110b, 110c. The user information may include account information, account status, user preferences, features subscribed to by the user, user's current location, and allowable APNs. The HSS 136 may provide the user profile to a Mobility Management Entity (MME) 138, which controls network access of the communication devices 110a, 110b, 110c through the gateway 134. The network 130 may also contain various servers that provide content or other information related to user accounts. The above is merely exemplary, other equipment may be present in and external to the network 130, but are not shown.

Figure 2:
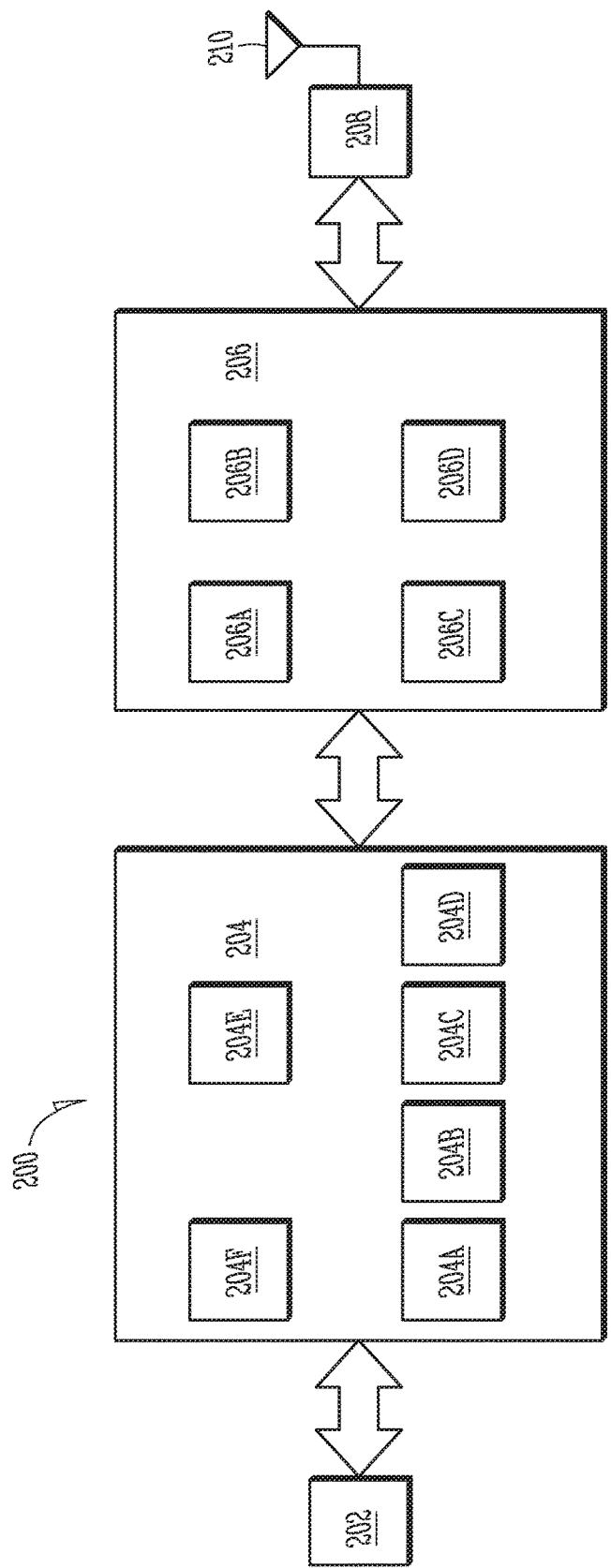
FIG. 2 illustrates components of a communication device in accordance with some embodiments.

Embodiments described herein may be implemented into a system using any suitably configured hardware and/or software. FIG. 2 illustrates components of a communication device in accordance with some embodiments. At least some of the components shown may be used in the communication device shown in FIG. 1. The communication device 200 and other components may be configured to use the synchronization signals as described herein. The communication device 200 may be a stationary, non-mobile device or may be a mobile device. In some embodiments, the communication device 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, 4G baseband processor 204c, and/or other baseband processor(s) 204d for other existing generations, generations in development or to be developed in the future (e.g., 5G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or bandpass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator. In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the communication device 200 may include additional elements such as, for example, memory/storage, display, camera, sensor, and/or input/output (I/O) interface as described in more detail below. In some embodiments, the communication device 200 described herein may be part of a portable wireless communication device, such as a personal digital assistant (PDA), a laptop or portable computer with wireless communication capability, a tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the communication device 200 may include one or more user interfaces designed to enable user interaction with the system and/or peripheral component interfaces designed to enable peripheral component interaction with the system. For example, the communication device 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
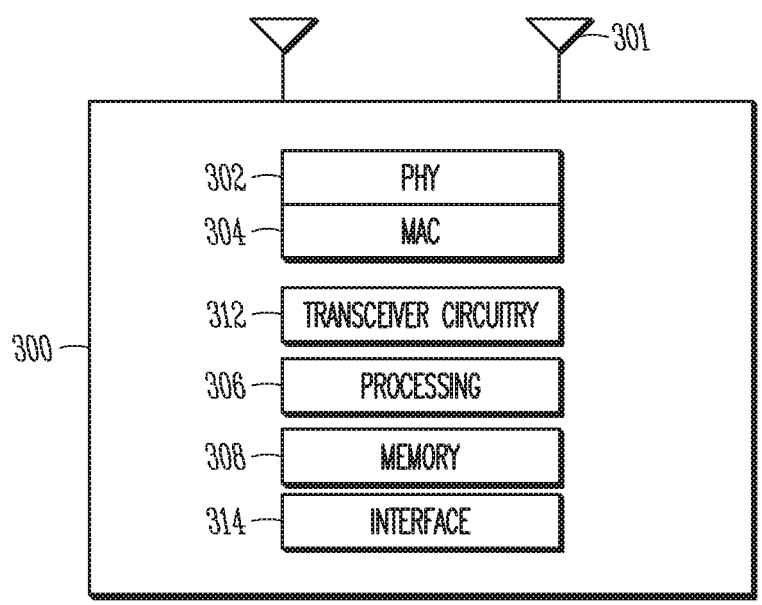
FIG. 3 illustrates a block diagram of a communication device in accordance with some embodiments.

FIG. 3 is a block diagram of a communication device in accordance with some embodiments. The device may be a communication device, for example, such as that shown in FIG. 1. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, WiGig, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a RF range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
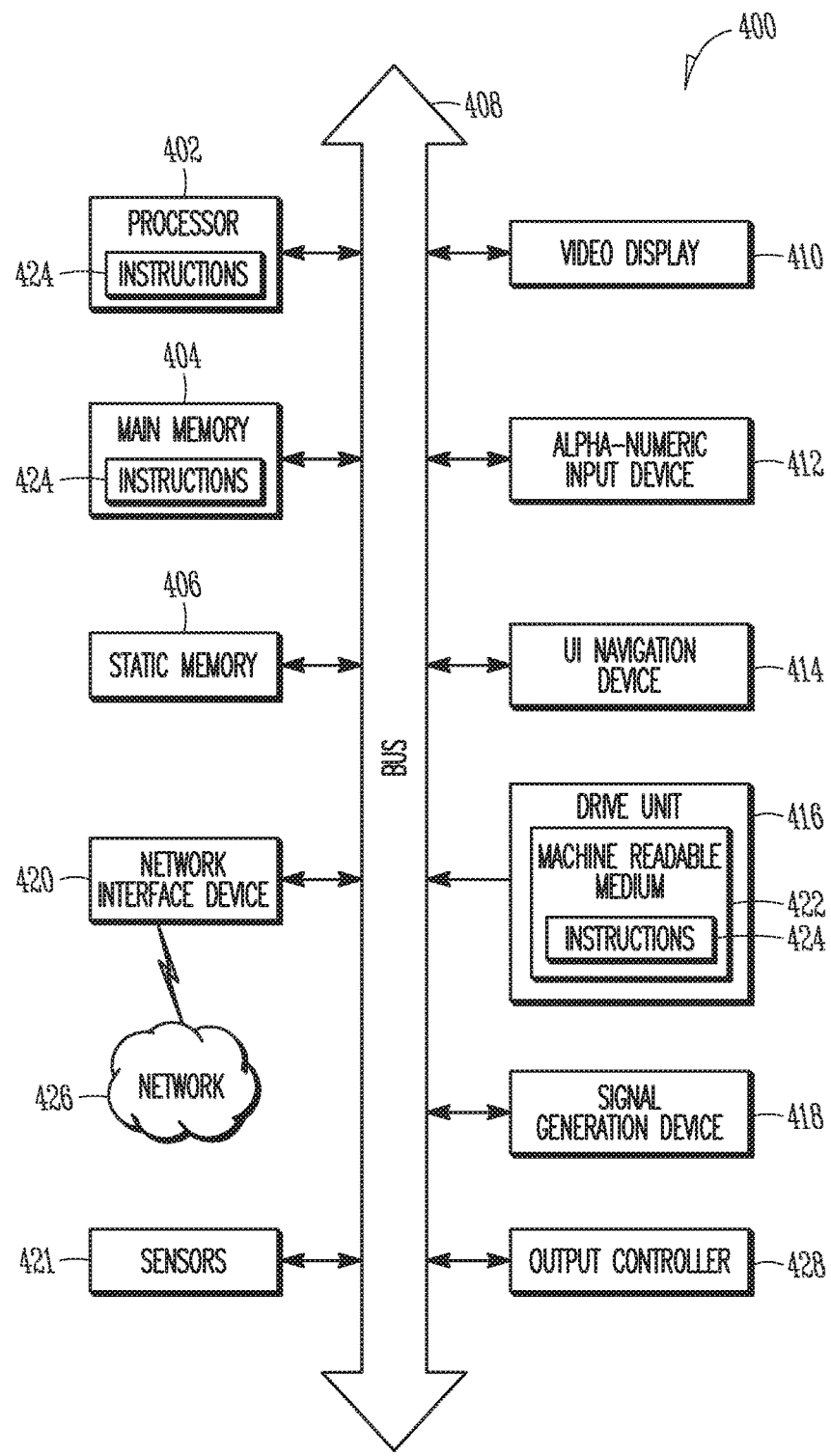
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a user equipment (UE), evolved Node-B (eNB), PC, a tablet PC, a STB, a PDA, an AP, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®. IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

Figure 5:
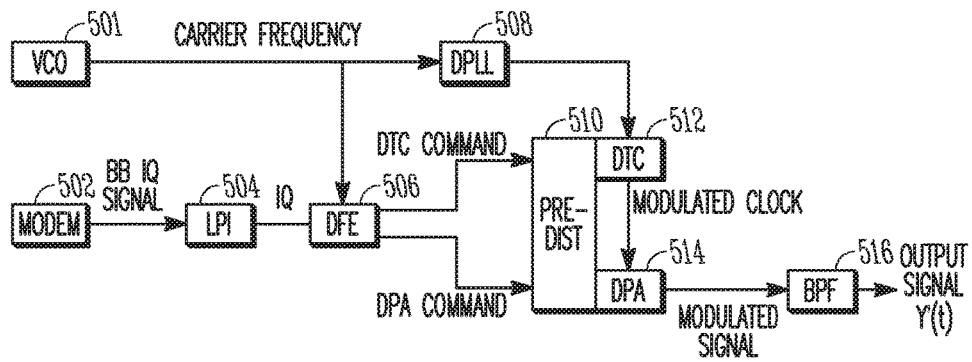
FIG. 5 illustrates a Digital Polar Transmitter (DTx) in accordance with some embodiments.

In particular, as discussed above, one issue with communication devices such as those shown in FIGS. 1-4 is non-ideality in the conversion between input data and analog output signals. In particular, non-ideality may result from the conversion of an input wave into an analog signal, as described in more detail below. The input wave may be substantially a square or triangular wave. Communication devices may contain both receiver and transmitter chains. For example, various transmitters implementations may be used in the transmitter chain, each of which may contain variations on type and number of components. Some communication devices, in particular, may use a Digital Polar Transmitter (DTx). FIG. 5 illustrates a DTx in accordance with some embodiments. The various elements described as part of the DTx described may be implemented, for example, in hardware and connected on a substrate or printed circuit board in any of the communication devices shown in FIGS. 1-4. The various components described may be formed from different circuitry.

In the DTx 500 may enable modulation data to be represented by amplitude and phase, rather by real and imaginary (IQ) components. As shown, the DTx 500 may include a modem 502 that provides an IQ signal. The signal may be supplied from the modem 502 at baseband. In some embodiments, the baseband IQ signal may be at 640 MHz.

The baseband IQ signal may be provided to a linear phase interpolator (LPI) 504. The LPI 504 may interpolate the baseband IQ signal, taking samples at a predetermined rate. In some embodiments, the LPI 504 may have a 2.56 GHz sampling rate such that an IQ output of the LPI 504 is 2.56 GHz.

The output from the LPI 504 may be supplied to a digital front end (DFE) 506. The DFE 506 may also be supplied with a carrier frequency signal, which may be from, for example, the 800 MHz band to any of the 5G bands of up to about 60 GHz. The carrier frequency may be supplied in a local oscillator (LO) signal from a voltage controlled oscillator (VCO) 501. The VCO 501 may provide the carrier frequency signal to modules in both the transmit and receive chain.

The DFE 506 may generate digital commands (code words) from the complex baseband data samples, that is at the carrier frequency based on the interpolated values from the LPI 504. The code words may include a digital-to-time converter (DTC) code word and a digital power amplifier (DPA) code word. The DTC code word and DPA code word may be provided respectively to a digitally controlled edge interpolator (DCEI) digital to time converter (DTC) 512 and DPA 514. The DPA 514 may be a class D digital switched combiner, switched cap power amplifier that converts the amplitude digital data directly to signal power to provide amplitude modulation. The class D DPA 514 may exhibit more than 40% improved efficiency compared to an analog class AB PA. The DTC 512 may convert the phase digital data to phase modulation (edge delay) of the LO signal from the DPLL 508.

In some embodiments, as shown in FIG. 5 DTC code word and DPA code word may be provided through a pre-distorter 510 respectively to a DTC 512 and DPA 514. The pre-distorter 510 may be used to compensate for non-idealities in the resulting output signal from the DTx 500 when different code words are used. This may be caused as different code words may produce output signals that do not vary as expected; incrementing the code word from a first value to a second value may, for example, alter the output signal in a particular manner, while incrementing the code word again by the same amount from the second value to a third value may alter the output signal in a manner slightly different from the particular manner; the resulting differences may be non-linear or non-ideal. The variations may be due, for example, to manufacturing and/or thermal deviations of the circuitry within the DTC 512 and/or DPA 514. The pre-distorter 510 may be used to account for such a variation, which may be determined via a calibration or training session prior to the communication device being provided to an end user and perhaps periodically during use by an end user.

In addition to the compensated signal being supplied to the DTC 512, timing information is also provided. More specifically, the local oscillator signal is supplied to a digital phase lock loop (DPLL) 508. The output from the DPLL 508 is essentially a clock signal, which has consistent phases with the VCO signal, supplied to the DTC 512. The DTC 512 provides a modulated clock signal to the DPA 514. The DPA codeword indicates the amplitude and phase of the signal and the DTC 512 indicates to the DPA 514 when the next DPA codeword is to be used. This permits the DPA 514 to provide a series of samples modulated at the carrier frequency as an RF modulated signal as an output. The modulated signal from the DPA 514 may then be supplied to a bandpass filter (BPF) 516 from which the output signal of the DTx 500 is provided. The modulated signal from the DPA 514 may take any of a number of wideband shapes such as a square or triangular wave for example. The BPF 516 may remove frequencies outside of the desired bandwidth and provide an analog output to an antenna (not shown).

A desired modulated signal Y(t) to be provided from the DTx may be given by:

$$\text{Polar: } Y(t)=A(t)\cdot\cos(2\pi\cdot F_c\cdot t+\varphi(t))$$

where A(t) and φ(t) are the amplitude and phase, respectively and $F_c$ is the carrier-frequency. As above, the carrier frequency may be from 800 MHz to 60 GHz or higher, depending on the implementation.

Figure 6:
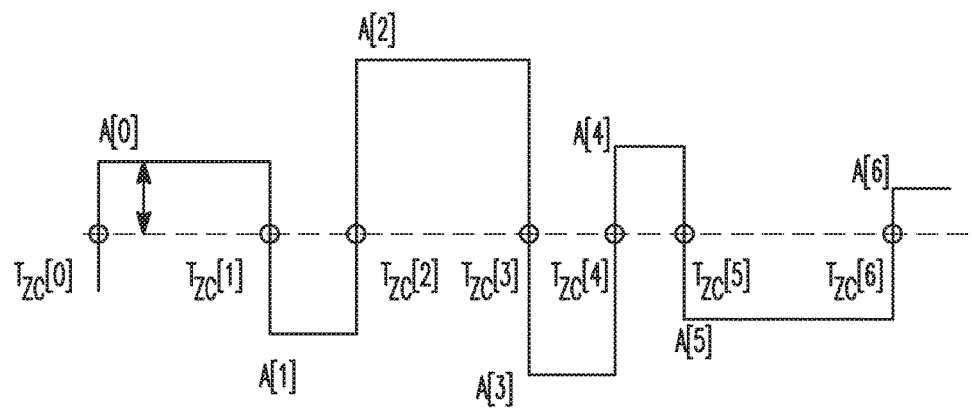
FIG. 6 illustrates an example of an output signal in accordance with some embodiments.

The DTx 500 output may be modeled as a square signal with configured amplitudes and zero-crossing (ZC) times. FIG. 6 illustrates an example of an output signal in accordance with some embodiments. The ZC times (also described as ZC positions or ZCs) are shown as $t_{ZC}[n]$ and the amplitude are shown as A[n], both of which may vary such that adjacent magnitudes and the separation between adjacent ZC times may be uniform in some cases and be non-uniform in other cases. The DTx output square wave signal (also referred to as the BPF input signal) prior to application of the BPF 516 shown in FIG. 6 can be written as:

$$Y(t)=Y(t|t_{zc}^k \leq t < t_{zc}^{k+1})=A[k]\cdot(-1)^k$$

where A[k] are determined by the DPA commands, and the DTC commands determine $t_{zc}^k$. As shown in FIG. 6, the amplitude of the square wave (shown as A[n]) provided to the BPF 516 may vary in both the positive and negative portions of the cycle, and the frequency of the cycle (shown as tx[n]) may vary with each zero crossing. As the output signal from the DPX 500 may have out-of-band harmonics, these harmonics may, as shown in FIG. 5 be eliminated or mitigated in some embodiments by through the use of the BPF 516. The output of the BRF 516 may be:

$$Y''(t) = \text{BPF}\{Y(t)\}$$

The DFE 506 may calculate and provide DPA and DTC code words (A[k], $t_{zc}^k$) to provide an output signal that is as close as possible to the desired output signal:

$$Y''(t|t_{zc}^k \leq t < t_{zc}^{k+1}) = \text{BPF}\{A[k] \cdot (-1)^k\} \approx A(t) \cdot \cos(2\pi F_c t + \varphi(t)) = Y(t)$$

A[k] may be selected dependent on the amplitude of the baseband signal, and $t_{zc}^k$ dependent on the zero crossing time of the modulated signal (Y(t)). This straightforward approach, however, may not be optimal due to the effects of the BPF 516 which may be dependent on the signal characteristics. In particular, such an approach may limit the error vector magnitude (EVM) when a large bandwidth (BW) signal, such as 160 MHz, is used (rather than say a 20 MHz channel). In fact, EVM and other issues increase with increasing bandwidth when the straightforward approach is used due to the presence of the BPF 516.

To improve the EVM, a further pre-distortion calculation may be determined and provided in the DFE 506 used to compensate for the changes in the zero crossings $t_{zc}^k$ caused by the BPF 516. The use of the additional pre-distortion compensation may, in some cases, be limited to correcting for the non-ideality of the BPF 516 on the modified square signal and may not compensate for any non-linearities in the analog noise-shaping loop. Without the use of pre-distortion, the theoretical (floating point+ideal components) signal may be limited to −45 dBc EVM for a BW of 160 MHz and to about −60 dBc for a BW of 20 MHz, the BPF effects increasing with increasing BW. The use of pre-distortion may in some cases push the theoretical EVM limit to −74 dBc for 160 MHz BW and about −81 dBc for 20 MHz BW. Similarly, without the use of pre-distortion, the out-of-band noise may have a lowpass shape. With the use of pre-distortion, the out-of-band noise may have a relatively flat white out-of-band noise floor.

Figure 7:
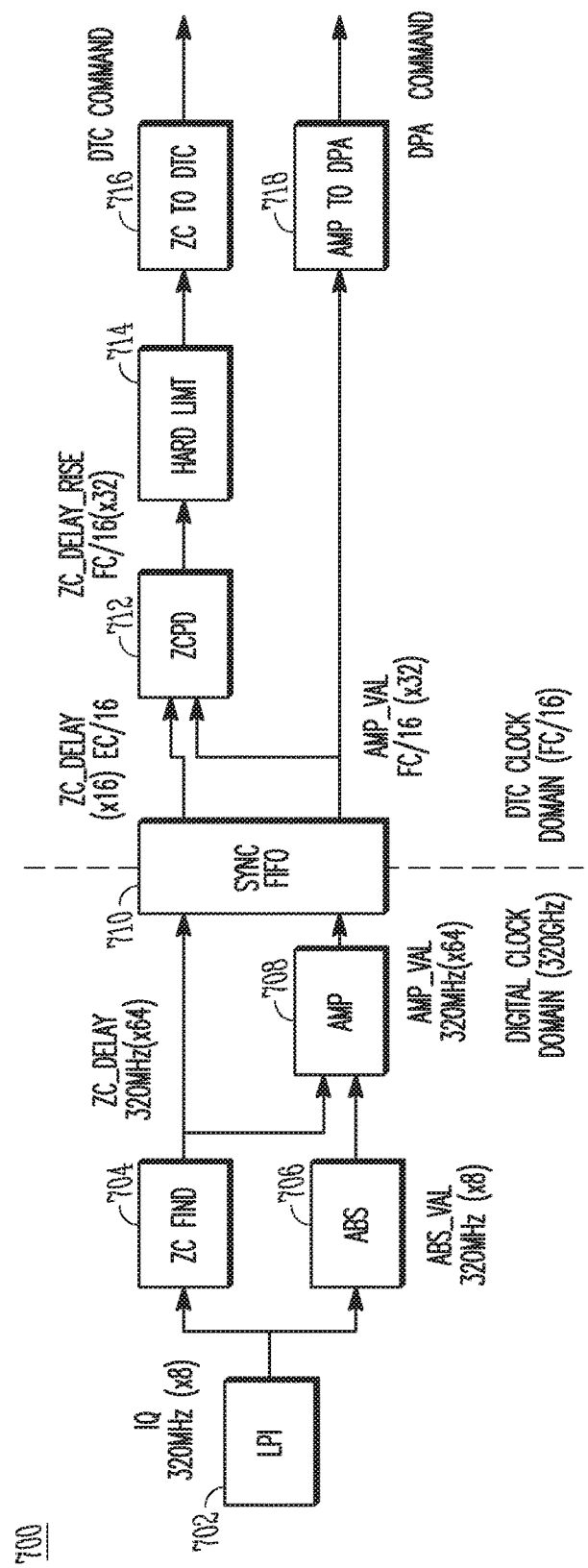
FIG. 7 illustrates a digital front end (DFE) in accordance with some embodiments.

FIG. 7 illustrates a DFE in accordance with some embodiments. The DFE 700 may be provided in the DTx shown in FIG. 5 and in the communication devices of FIGS. 1-4. The various modules/circuitry shown in FIG. 7 may be implemented in hardware, for example, as described above. The circuitry shown in FIG. 7 include an LPI 702, a zero crossing (ZC) finder 704 (or ZC finder circuitry), an Absolute Value determiner (ABS) 706, an Amplitude determiner (AMP) 708, a synchronized First-In-First-Out (Sync FIFO) latch 710, a ZC pre-distorter (ZCPD) 712, a Hard Limiter 714, a ZC-to-DTC converter 716 and an AMP-to-DPA converter 718. Note that, similar to the various hardware modules shown in FIG. 5, the internal circuitry of the various hardware modules (such as comparators, latches, FETs, multiplexors, shift registers, counters, and delays, as well as the various transistors, resistors and capacitors that form these) are not shown for convenience.

Similar to the LPI shown in FIG. 5, the LPI 702 may interpolate the baseband IQ signal. The LPI 702 may have 8 channels and operate at a frequency of 320 MHz. The signal from the LPI 702 may be provided to both the ZC finder 704 and ABS determiner 706. The ZC finder 704 may calculate ZC positions of the sampled signal and provide a pulse or other signal when the ZC occurs. In one embodiment, the ZC finder 704 may determine the ZC by use a high sampling rate to coarsely calculating the signal and subsequently finding sign changes in the signal. Linear interpolation may then be used to further increase the accuracy of the ZC location. The ABS determiner 706 may calculate the absolute value of each sample.

The output of the ZC finder 704 may be supplied to the AMP 708 and the Sync FIFO 710. The AMP 708, using the signals from the ZC finder 704, may calculate the value of the magnitude at the ZC positions. The magnitude calculation may be done, for example, by linear interpolation on the baseband absolute values determined by the ABS 706.

The ABS 706, like the ZC finder 704, may provide an output to an input of the Sync FIFO latch 710. The Sync FIFO latch 710 may adjust clocking of the signal without otherwise altering the signal. The Sync FIFO latch 710 may change the clock domain from a digital clock (320 MHz) to a DTC clock (about Fe). This upconversion of the frequency permits the output commands (code words) to occur at the DTC clock rate. The Sync FIFO latch 710 may change (either increase or decrease) the signal frequency, dependent on the embodiment.

The output of the AMP 708 may then be supplied from the Sync FIFO latch 710 to the AMP-to-DPA 718. The output to create the DTC code word from the Sync FIFO latch 710 may be supplied to the ZCPD 712. The ZCPD 712 may correct impairments caused by the presence of the BPF. More specifically, the ZCPD 712 may adjust the signal delay of the rise time so that the output rise time from the ZCPD 712 either leads or lags the input rise time. The amount of delay, whether positive or negative, may be dependent on the absolute value of the amplitude or shifts in amplitude, which may also be supplied to the ZCPD 712 from the Sync FIFO latch 710. The amount of delay may, as shown in the following figures, increase with increasing percentage change from the last absolute value of the amplitude. This may be due, for example, to the fact that the effect of the BPF on the output signal may be greater for a change in the absolute value of adjacent samples of the same amount from say 2 to 8 mV (400%) than for 8 to 14 mV (80%), even though the magnitude of the change is the same. The manner in which the inputs to the ZC-to-DTC converter 716 and the AMP-to-DPA 718 are converted to the DTC and DPA code words to produce the desired output signal from the BPF may be determined based on one or more training sequences.

The output from the ZCPD 712 may be supplied to the ZC-to-DTC converter 716 through the Hard Limiter 714. The ZC-to-DTC converter 716 may determine the appropriate DTC code words from the ZC delay. The DTC code words, as above, provide the delay relative to the VCO clock signal and the ZC delay is relative to the digital clock. However, the ZC-to-DTC converter 716 may have input or output limitations, such as to the magnitude of the signal or to changes in adjacent signals. The output from the ZCPD 712 may further result, in some cases, in a signal that is excessively large for the ZC-to-DTC converter 716 or may result in a code word from the ZC-to-DTC converter 716 that is too large for the DTC shown in FIG. 5 to produce for a delay. Thus, before providing the ZCPD output to the ZC-to-DTC converter 716, the output from the ZCPD 712 may be supplied to the Hard Limiter 714. The Hard Limiter 714 may limit the jump between adjacent edges in order to meet the DTC limitations and produce a valid code sequence (i.e., a code word that does not exceed input limitations of the DTC or that ensures that the DTC produces a value output). The Hard Limiter 714 may include, for example, an op-amp or other circuitry configured to provide an output limited to between an adjustable (or pre-set) minimum and maximum value.

Figure 8:
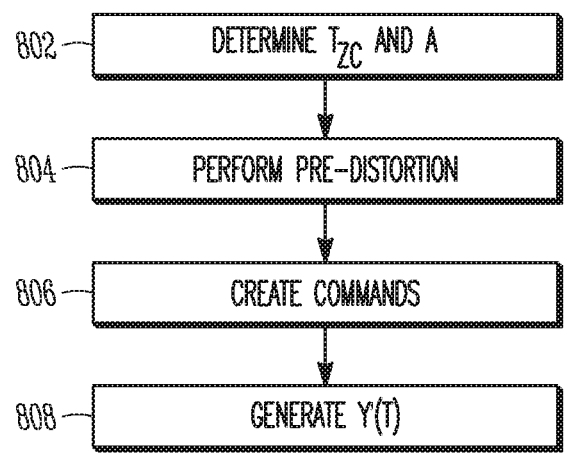
FIG. 8 is a block flowchart of a method of providing an output signal in accordance with some embodiments.

FIG. 8 is a block flowchart of a method of providing an output signal in accordance with some embodiments. The method may be performed by the DTx and DFE shown respectively in FIGS. 5 and 7 and in any of the communication devices shown in FIGS. 1-4. The DFE may first determine the ZC of Y(t) the desired output signal and subsequently, at operation 802, the ZC finder may calculate the ZC (DTC) value $t_{zc}^k$ from the ZC so determined. In addition, the DFE may determine the amplitude (DPA) value A[k] at the AMP by sampling the envelope (|Z(t)|) between adjacent ZCs.

Figure 9:
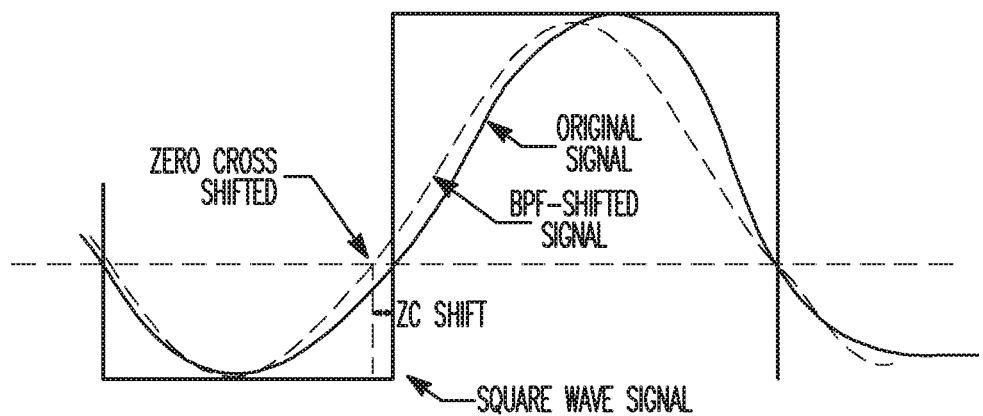
FIG. 9 is an example of the shift in an output signal in accordance with some embodiments.

The values so determined may then be upconverted at the Sync FIFO. The upconverted DTC $t_{zc}^k$ value may then be modified at operation 804. The modification may pre-distort $t_{zc}^k$ k to obtain a compensated DTC value $\tilde{t}_{zc}^k = F_{PD}(t_{zc}^k, A)$ to compensate for the BPF in the DTx. As above, after the modeled square wave signal that is the DPA output goes through the bandpass filter, the ZC positions may shift. FIG. 9 is an example of the shift in an output signal in accordance with some embodiments. The pre-distortion may compensate for this to shift the ZC positions so that after the BPF the ZC positions return to the desired positions. The pre-distortion to correct the ZC shift shown in FIG. 9 may be given by:

$$\tilde{t}_{zc}^k = F_{PD}(t_{zc}^k, A) = t_{zc}^k + \frac{A_k - A_{k-1}}{A_k + A_{k-1}} \cdot C_0 \cdot T_c$$

where $A_{k-1}$ is the pre-ZC amplitude and $A_k$ is the post-ZC amplitude. $T_c$ is the nominal carrier cycle length $$\left(\frac{1}{F_c}\right),$$

$C_0$ is a predetermined constant determined through testing and a calibration process. For example, for a square wave signal, $C_0=0.1$ was determined to be optimal. The above compensated DTC value is only one manner of determining an amount of pre-distortion to apply to the ZC to cause the new value to lead or lag the original value. There are many ways to calculate this correction with different complexity and accuracy; the equation above is a simple version which only depends on $A_k$ and $A_{k-1}$.

After obtaining the compensated DTC value, the DFE may translate this $\tilde{t}_{zc}^k$ value to a DTC command. Similarly, the DFE may translate the A[k] value to a DPA command. The DTx and DPA commands may be generated at operation 806.

At operation 808, the DTC command may be used to modulate the VCO and trigger the DPA output. This modulated output signal may then be bandpass filtered and supplied as an output of the DTx. Similar methodology may be used to compensate for multiple bandpass (or other) filters used in the DTx. The above compensation may be performed at baseband or at RF frequencies, dependent on the embodiment. For example, the compensation may be performed on the signal amplitudes of the baseband signal provided to the LPI or DFE.

Figure 10A:
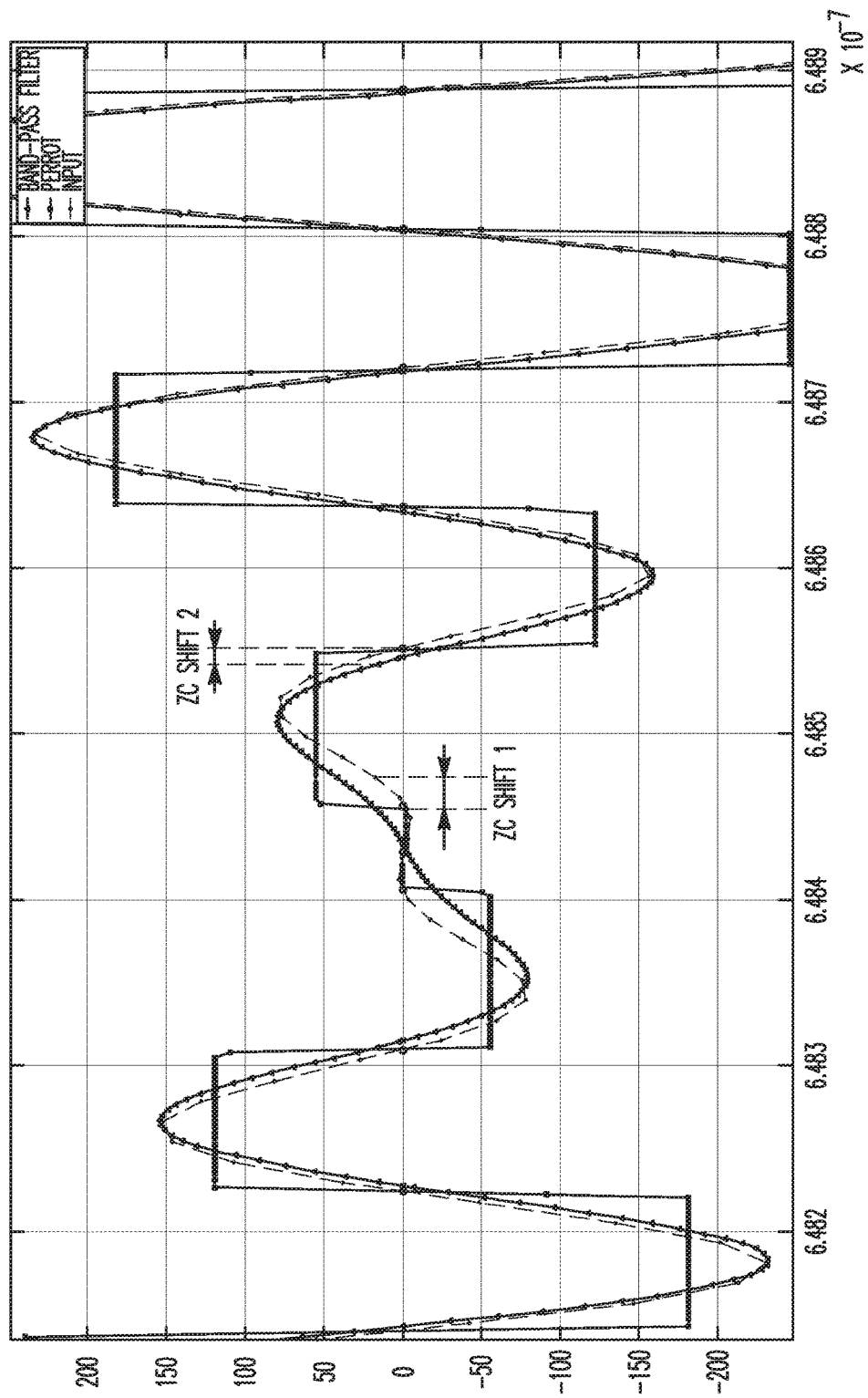
FIGS. 10A and 10B show simulations of a comparison between the desired and generated output signals without and with pre-distortion, respectively.
Figure 10B:
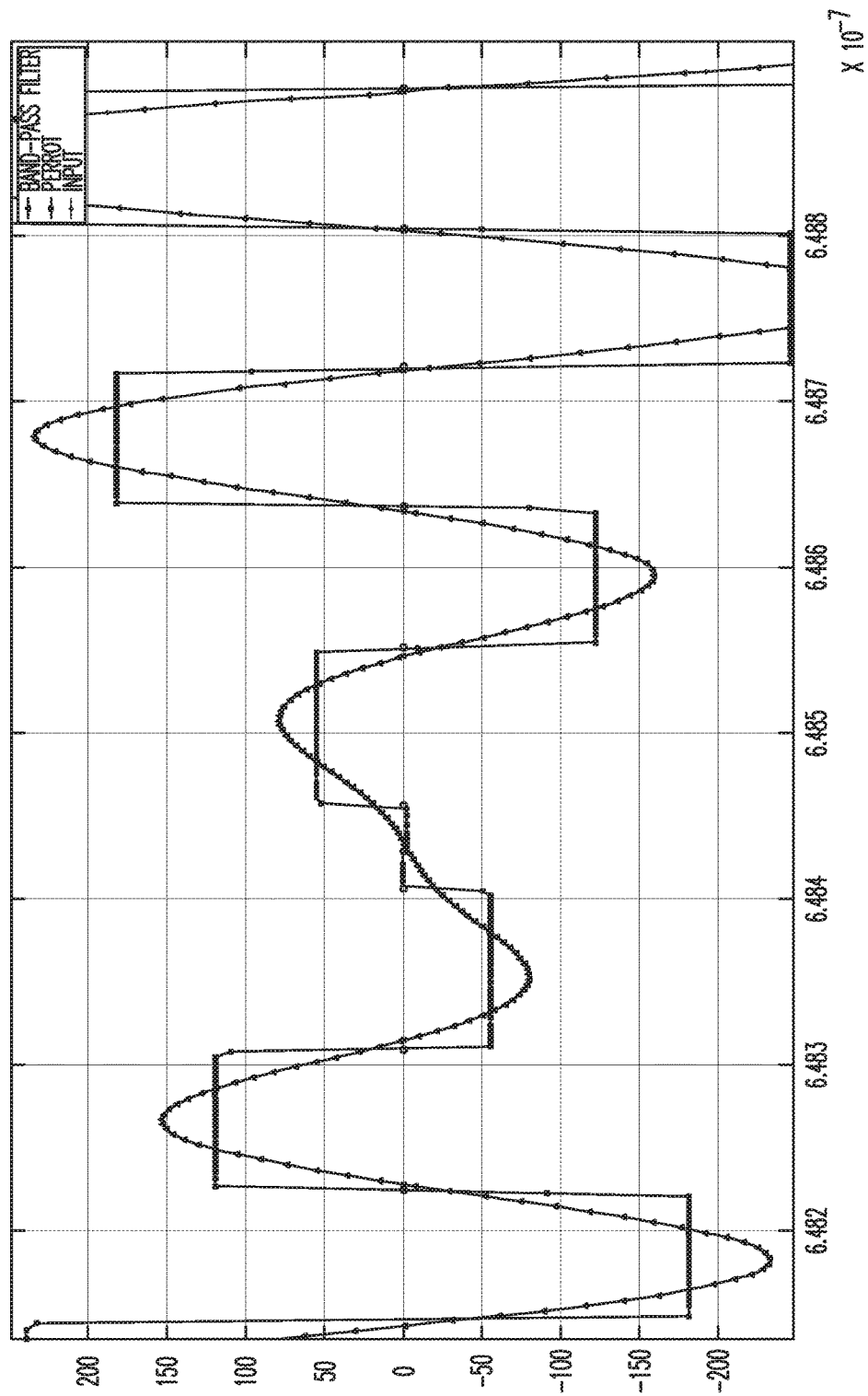

FIGS. 10A and 10B show simulations of a comparison between the desired and generated output signals without and with pre-distortion, respectively. The simulations were all performed using floating point calculations. The square wave signal input to the BPF is shown. As illustrated, the ZC shift in FIG. 10A is more pronounced for a larger proportional amplitude difference between adjacent zero crossings, causing the signal from the BPF to deviate significantly from the desired output signal. The simulations in FIG. 10A achieve a limited EVM of −45 dB. With pre-distortion, as shown in FIG. 10B, the deviation is, at least, reduced to a substantially negligible extent. The simulations in FIG. 10B achieve an EVM of −74 dB.

Figure 11A:
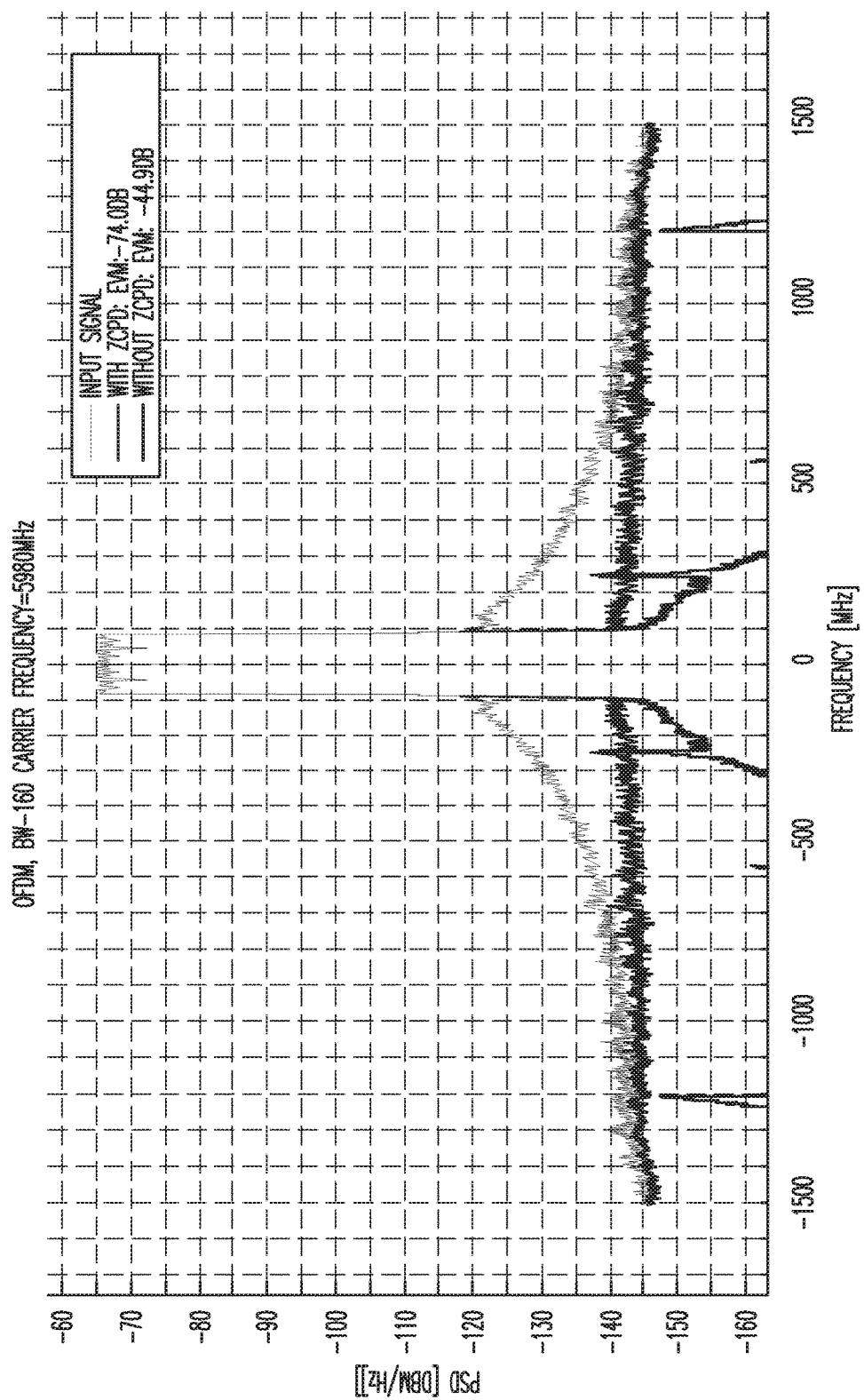
FIGS. 11A and 11B show simulations of spectra of the generated output signal without and with pre-distortion.
Figure 11B:
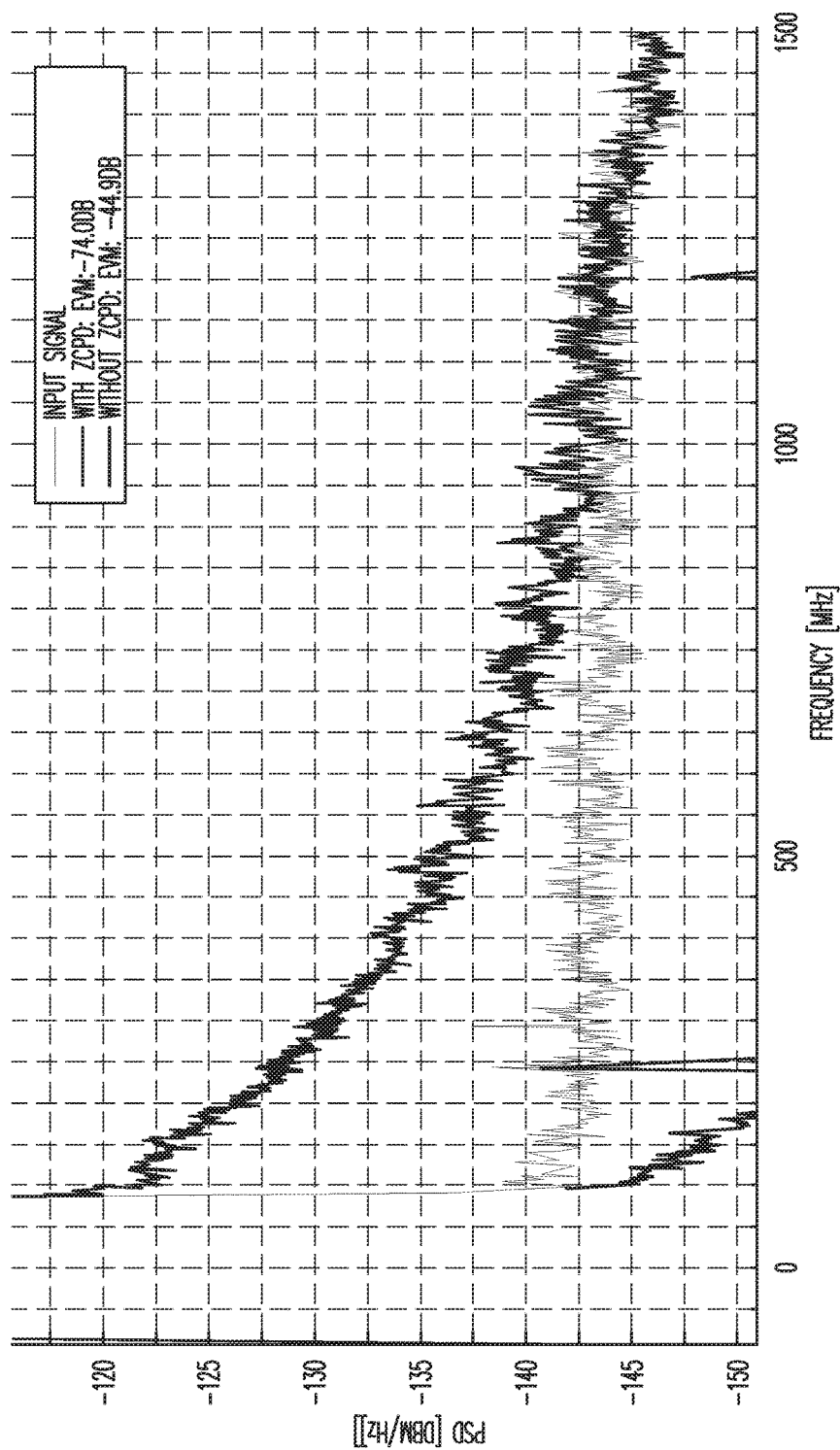

FIGS. 11A and 11B show simulations of spectra of the generated output signal without and with pre-distortion. As can be seen, at a carrier frequency of 5.98 GHz and a bandwidth of 160 MHz, without pre-distortion, the power spectral density (PSD) tailors off slowly, having significant PSD (about 10%) over about 1.4-1.5 GHz from the center frequency; the out-of-band noise having a lowpass shape. With pre-distortion, the PSD tailors off immediately, having negligible PSD outside of the signal bandwidth; the out-of-band noise having a relatively flat white out-of-band noise floor.

Examples

Example 1 is an apparatus of a transmitter comprising: a bandpass filter (BPF) arranged to produce a transmitter output signal; and a digital front end (DFE) arranged to receive a carrier frequency signal, the DFE comprising: a zero crossing (ZC) pre-distorter (ZCPD) arranged to compensate for ZC distortion introduced by the BPF and produce code words to generate an input signal to be applied to the BPF.

In Example 2, the subject matter of Example 1 optionally includes, wherein: for a particular ZC, the ZCPD is configured to apply compensation that is dependent on magnitudes of one of: the input signal immediately prior to and immediately after the particular ZC, or a baseband signal supplied to the DFE immediately prior to and immediately after the particular ZC.

In Example 3, the subject matter of any one or more of Examples 1-2 optionally include, wherein: the code words comprise a Digital-To-Time Converter (DTC) code word and a Digital Power Amplifier (DPA) code word, and the DFE further comprises: ZC-to-DTC circuitry arranged to receive a value based on an output of the ZCPD to produce a DTC code word and indicate ZC position to a DTC of the transmitter using the DTC code word; and an Amplitude Determiner (AMP)-to-DPA converter arranged to receive a magnitude value to produce the DPA code word to indicate a magnitude to a DPA of the transmitter.

In Example 4, the subject matter of Example 3 optionally includes, wherein the DFE further comprises: a linear phase interpolator (LPI) arranged to interpolate a first interpolated baseband in-phase quadrature-phase (IQ) signal and produce a second interpolated baseband IQ signal, ZC finder circuitry arranged to determine ZC positions of the second interpolated baseband IQ signal, Absolute Value Determiner (ABS) circuitry arranged to produce magnitudes of the second interpolated baseband IQ signal, Amplitude Determiner (AMP) circuitry arranged to determine the magnitudes of the second interpolated baseband IQ signal, and a synchronized First-In-First-Out (Sync FIFO) latch arranged to adjust clocking of the ZC positions and the magnitudes of the second interpolated baseband IQ signal to change a frequency of the ZC positions and the magnitudes of the second interpolated baseband IQ signal to a frequency of the carrier frequency signal and to produce output signals to the ZCPD.

In Example 5, the subject matter of any one or more of Examples 3-4 optionally include, wherein the DFE further comprises: a Hard Limiter arranged to limit an output from the ZCPD to the ZC-to-DTC circuitry to produce a valid DTC code word independent of an input to the ZC-to-DTC.

In Example 6, the subject matter of any one or more of Examples 1-5 optionally include, further comprising: a linear phase interpolator (LPI) arranged to interpolate a baseband in-phase quadrature-phase (IQ) signal and supply an interpolated baseband IQ signal to the DFE, a Digital-To-Time Converter (DTC) arranged to produce a ZC position based on a compensated DTC code word from the DFE; and a Digital Power Amplifier (DPA) arranged to produce the input signal having an amplitude based on a compensated DPA code word and a ZC based on the compensated DTC code word from the DFE and to supply the input signal to the BPF.

In Example 7, the subject matter of Example 6 optionally includes, further comprising: a pre-distorter arranged to receive a DTC code word and a DPA code word from the DFE, compensate for non-linearities in generation of the DTC and DPA code words and produce the compensated DTC and DPA code words.

In Example 8, the subject matter of any one or more of Examples 1-7 optionally include compensation applied by the ZCPD to compensate for the ZC distortion caused by the BPF is:

$$\tilde{t}_{zc}^k = t_{zc}^k + \frac{A_k - A_{k-1}}{A_k + A_{k-1}} \cdot C_0 \cdot T_c$$

where $t_{zc}^k$ is an uncompensated ZC position. $\tilde{t}_{zc}^k$ is a compensated ZC position, $A_{k-1}$ is a pre-ZC magnitude, $A_k$ is a post-ZC magnitude, $T_c$ is a nominal carrier cycle length, and $C_0$ is a predetermined constant.

Example 9 is an apparatus of a digital front end (DFE), the apparatus comprising: a zero crossing (ZC) pre-distorter (ZCPD) arranged to receive a carrier frequency signal, compensate for ZC distortion to a signal caused by a band pass filter (BPF), the signal based on an output from the ZPCD, and produce a Digital-To-Time Converter (DTC) code word that is dependent on a signal magnitude prior to and after the ZC; and ZC-to-DTC circuitry arranged to produce a DTC code word based on an output associated with the ZCPD, the DTC code word to indicate a ZC position.

In Example 10, the subject matter of Example 9 optionally includes, further comprising: an Amplitude Determiner (AMP)-to-Digital Power Amplifier (DPA) converter arranged to receive a magnitude value and in response produce a DPA code word to indicate a magnitude to a DPA.

In Example 11, the subject matter of Example 10 optionally includes, further comprising: a linear phase interpolator (LPI) arranged to interpolate a first interpolated baseband in-phase quadrature-phase (IQ) signal and produce a second interpolated baseband IQ signal, ZC finder circuitry arranged to determine ZC positions of the second interpolated baseband IQ signal, Absolute Value Determiner (ABS) circuitry arranged to produce magnitudes of the second interpolated baseband IQ signal, Amplitude Determiner (AMP) circuitry arranged to determine the magnitudes of the second interpolated baseband IQ signal, and a synchronized First-In-First-Out (Sync FIFO) latch arranged to adjust clocking of the ZC positions and the magnitudes of the second interpolated baseband IQ signal to change the frequency of the ZC positions and the magnitudes of the second interpolated baseband IQ signal and produce output signals to the ZCPD.

In Example 12, the subject matter of any one or more of Examples 10-11 optionally include, further comprising: a Hard Limiter arranged to limit an output from the ZCPD to the ZC-to-DTC circuitry to produce a valid DTC code word.

In Example 13, the subject matter of any one or more of Examples 9-12 optionally include, wherein: compensation produced by the ZCPD is free from compensation for non-linear responses to the DTC and DPA code words.

In Example 14, the subject matter of any one or more of Examples 9-13 optionally include compensation applied by the ZCPD to compensate for the ZC distortion caused by the BPF is:

$$\tilde{t}_{zc}^k = t_{zc}^k + \frac{A_k - A_{k-1}}{A_k + A_{k-1}} \cdot C_0 \cdot T_c$$

where $t_{zc}^k$ is an uncompensated ZC position, $\tilde{t}_{zc}^k$ is a compensated ZC position, $A_{k-1}$ is a pre-ZC magnitude, $A_k$ is a post-ZC magnitude, $T_c$ is a nominal carrier cycle length, and $C_0$ is a predetermined constant.

Example 15 is a method of compensating for zero crossing (ZC) distortion, the method comprising: determining ZC distortion in a ZC caused by a bandpass filter (BPF) used to convert an output digital signal into an analog signal at a carrier frequency; compensating for the ZC distortion and producing an output value based thereon; and generating code words to create an output digital to be applied to the BPF after compensating for the ZC distortion.

In Example 16, the subject matter of Example 15 optionally includes, wherein: compensation for the ZC distortion is dependent on one of: the output signal immediately prior to and immediately after the ZC, or a baseband signal on which the output signal is based immediately prior to and immediately after the ZC.

In Example 17, the subject matter of any one or more of Examples 15-16 optionally include, wherein: the code words comprise a Digital-To-Time Converter (DTC) code word to indicate the ZC and a Digital Power Amplifier (DPA) code word to indicate a magnitude to a DPA.

In Example 18, the subject matter of Example 17 optionally includes, further comprising: limiting the output value to between a hardware-limited minimum and maximum used to produce a valid DTC code word.

In Example 19, the subject matter of any one or more of Examples 17-18 optionally include, further comprising: interpolating a first interpolated baseband in-phase quadrature-phase (IQ) signal and producing a second interpolated baseband IQ signal; determining ZCs of the second interpolated baseband IQ signal; providing and determining absolute magnitudes of the second interpolated baseband IQ signal; and adjusting clocking of the ZCs and the absolute magnitudes of the second interpolated baseband IQ signal to change a frequency of the ZCs and the absolute magnitudes of the second interpolated baseband IQ signal prior to compensating for the ZC distortion.

In Example 20, the subject matter of any one or more of Examples 17-19 optionally include, further comprising: after generation of the DTC and DPA code words, compensating for non-linear responses to the DTC and DPA code words.

Example 21 is an apparatus of compensating for zero crossing (ZC) distortion, the apparatus comprising: means for determining ZC distortion in a ZC caused by a bandpass filter (BPF) used to convert an output digital signal into an analog signal at a carrier frequency; means for compensating for the ZC distortion and producing an output value based thereon, and means for generating code words to create an output digital to be applied to the BPF after compensating for the ZC distortion.

In Example 22, the subject matter of Example 21 optionally includes, wherein: compensation for the ZC distortion is dependent on one of: the output signal immediately prior to and immediately after the ZC, or a baseband signal on which the output signal is based immediately prior to and immediately after the ZC.

In Example 23, the subject matter of any one or more of Examples 21-22 optionally include, wherein: the code words comprise a Digital-To-Time Converter (DTC) code word to indicate the ZC and a Digital Power Amplifier (DPA) code word to indicate a magnitude to a DPA.

In Example 24, the subject matter of any one or more of Examples 21-23 optionally include, further comprising: means for limiting the output value to between a hardware-limited minimum and maximum used to produce a valid DTC code word.

In Example 25, the subject matter of any one or more of Examples 21-24 optionally include, further comprising: means for interpolating a first interpolated baseband in-phase quadrature-phase (IQ) signal and producing a second interpolated baseband IQ signal; means for determining ZCs of the second interpolated baseband IQ signal; means for providing and determining absolute magnitudes of the second interpolated baseband IQ signal; and means for adjusting clocking of the ZCs and the absolute magnitudes of the second interpolated baseband IQ signal to change a frequency of the ZCs and the absolute magnitudes of the second interpolated baseband IQ signal prior to compensating for the ZC distortion.

In Example 26, the subject matter of any one or more of Examples 21-25 optionally include, further comprising: means for compensating, after generation of the DTC and DPA code words, for non-linear responses to the DTC and DPA code words.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:
1. An apparatus of a transmitter, comprising:
a bandpass filter (BPF) arranged to produce a transmitter output signal; and
a digital front end (DFE) arranged to receive a carrier frequency signal, the DFE comprising:
 a zero crossing (ZC) pre-distorter (ZCPD) arranged to compensate for ZC distortion introduced by the BPF and produce code words to generate an input signal to be applied to the BPF;
 a linear phase interpolator (LPI) arranged to interpolate a first interpolated baseband in-phase quadrature-phase (IQ) signal and produce a second interpolated baseband IQ signal;
 ZC finder circuitry arranged to determine ZC positions of the second interpolated baseband IQ signal;
 Absolute Value Determiner (ABS) circuitry arranged to produce magnitudes of the second interpolated baseband IQ signal;
 Amplitude Determiner (AMP) circuitry arranged to determine the magnitudes of the second interpolated baseband IQ signal; and
 a synchronized First-In-First-Out (Sync FIFO) latch arranged to adjust clocking of the ZC positions and the magnitudes of the second interpolated baseband IQ signal to change a frequency of the ZC positions and the magnitudes of the second interpolated base- band IQ signal to a frequency of the carrier frequency signal and to produce output signals to the ZCPD.

2. The apparatus of claim 1, wherein:
for a particular ZC, the ZCPD is configured to apply compensation that is dependent on magnitudes of one of:
the input signal immediately prior to and immediately after the particular ZC, or
a baseband signal supplied to the DFE immediately prior to and immediately after the particular ZC.

3. The apparatus of claim 1, wherein:
the code words comprise a Digital-To-Time Converter (DTC) code word and a Digital Power Amplifier (DPA) code word, and
the DFE further comprises:
ZC-to-DTC circuitry arranged to receive a value based on an output of the ZCPD to produce a DTC code word and indicate ZC position to a DTC of the transmitter using the DTC code word; and
an Amplitude Determiner (AMP)-to-DPA converter arranged to receive a magnitude value to produce the DPA code word to indicate a magnitude to a DPA of the transmitter.

4. The apparatus of claim 3, wherein the DFE further comprises:
a Hard Limiter arranged to limit an output from the ZCPD to the ZC-to-DTC circuitry to produce a valid DTC code word independent of an input to the ZC-to-DTC.

5. An apparatus of a transmitter, comprising:
a bandpass filter (BPF) arranged to produce a transmitter output signal; and
a digital front end (DFE) arranged to receive a carrier frequency signal, the DFE comprising:
a zero crossing (ZC) pre-distorter (ZCPD) arranged to compensate for ZC distortion introduced by the BPF and produce code words to generate an input signal to be applied to the BPF;
a linear phase interpolator (LPI) arranged to interpolate a baseband in-phase quadrature-phase (IQ) signal and supply an interpolated baseband IQ signal to the DFE,
a Digital-To-Time Converter (DTC) arranged to produce a ZC position based on a compensated DTC code word from the DFE; and
a Digital Power Amplifier (DPA) arranged to produce the input signal having an amplitude based on a compensated DPA code word and a ZC based on the compensated DTC code word from the DFE and to supply the input signal to the BPF.

6. The apparatus of claim 5, further comprising:
a pre-distorter arranged to receive a DTC code word and a DPA code word from the DFE, compensate for non-linearities in generation of the DTC and DPA code words and produce the compensated DTC and DPA code words.

7. The apparatus of claim 1, wherein compensation applied by the ZCPD to compensate for the ZC distortion caused by the BPF is:

$$\tilde{t}_{zc}^k = t_{zc}^k + \frac{A_k - A_{k-1}}{A_k + A_{k-1}} \cdot C_0 \cdot T_c$$

where $t_{zc}^k$ is an uncompensated ZC position, $\tilde{t}_{zc}^k$ is a compensated ZC position, $A_{k-1}$ is a pre-ZC magnitude, $A_k$ is a post-ZC magnitude, $T_c$ is a nominal carrier cycle length, and $C_0$ is a predetermined constant.

8. An apparatus of a digital front end (DFE), the apparatus comprising:
a zero crossing (ZC) pre-distorter (ZCPD) arranged to receive a carrier frequency signal, compensate for ZC distortion to a signal caused by a band pass filter (BPF), the signal based on an output from the ZPCD, and produce a Digital-To-Time Converter (DTC) code word that is dependent on a signal magnitude prior to and after the ZC; and
ZC-to-DTC circuitry arranged to produce a DTC code word based on an output associated with the ZCPD, the DTC code word to indicate a ZC position,
wherein compensation applied by the ZCPD to compensate for the ZC distortion caused by the BPF is:

$$\tilde{t}_{zc}^k = t_{zc}^k + \frac{A_k - A_{k-1}}{A_k + A_{k-1}} \cdot C_0 \cdot T_c$$

where $t_{zc}^k$ is an uncompensated ZC point, $\tilde{t}_{zc}^k$ is a compensated ZC point, $A_{k-1}$ is a pre-ZC magnitude, $A_k$ is a post-ZC magnitude, $T_c$ is a nominal carrier cycle length, and $C_0$ is a predetermined constant.

9. The apparatus of claim 8, further comprising:
an Amplitude Determiner (AMP)-to-Digital Power Amplifier (DPA) converter arranged to receive a magnitude value and in response produce a DPA code word to indicate a magnitude to a DPA.

10. The apparatus of claim 9, further comprising:
a linear phase interpolator (LPI) arranged to interpolate a first interpolated baseband in-phase quadrature-phase (IQ) signal and produce a second interpolated baseband IQ signal,
ZC finder circuitry arranged to determine ZC positions of the second interpolated baseband IQ signal,
Absolute Value Determiner (ABS) circuitry arranged to produce magnitudes of the second interpolated baseband IQ signal,
Amplitude Determiner (AMP) circuitry arranged to determine the magnitudes of the second interpolated baseband IQ signal, and
a synchronized First-In-First-Out (Sync FIFO) latch arranged to adjust clocking of the ZC positions and the magnitudes of the second interpolated baseband IQ signal to change the frequency of the ZC positions and the magnitudes of the second interpolated baseband IQ signal and produce output signals to the ZCPD.

11. The apparatus of claim 9, further comprising:
a Hard Limiter arranged to limit an output from the ZCPD to the ZC-to-DTC circuitry to produce a valid DTC code word.

12. The apparatus of claim 8, wherein:
compensation produced by the ZCPD is free from compensation for non-linear responses to the DTC and DPA code words.

13. A method of compensating for zero crossing (ZC) distortion, the method comprising:
determining ZC distortion in a ZC caused by a bandpass filter (BPF) used to convert an output digital signal into an analog signal at a carrier frequency;

compensating for the ZC distortion and producing an output value based thereon; and
generating code words to create an output digital to be applied to the BPF after compensating for the ZC distortion,
interpolating a first interpolated baseband in-phase quadrature-phase (IQ) signal and producing a second interpolated baseband IQ signal;
determining ZCs of the second interpolated baseband IQ signal;
providing and determining absolute magnitudes of the second interpolated baseband IQ signal; and
adjusting clocking of the ZCs and the absolute magnitudes of the second interpolated baseband IQ signal to change a frequency of the ZCs and the absolute magnitudes of the second interpolated baseband IQ signal prior to compensating for the ZC distortion.

14. The method of claim 13, wherein:
compensation for the ZC distortion is dependent on one of:
the output signal immediately prior to and immediately after the ZC, or
a baseband signal on which the output signal is based immediately prior to and immediately after the ZC.

15. The method of claim 13, wherein:
the code words comprise a Digital-To-Time Converter (DTC) code word to indicate the ZC and a Digital Power Amplifier (DPA) code word to indicate a magnitude to a DPA.

16. The method of claim 15, further comprising:
limiting the output value to between a hardware-limited minimum and maximum used to produce a valid DTC code word.

17. The method of claim 15, further comprising:
after generation of the DTC and DPA code words, compensating for non-linear responses to the DTC and DPA code words.

* * * * *